July 18, 1967
C. V. THOMAS
3,331,901
METHOD AND APPARATUS FOR CONDENSING VOLATILE COMPONENTS
OF EXTRUDED THERMOPLASTIC TUBING
Filed Dec. 17, 1963
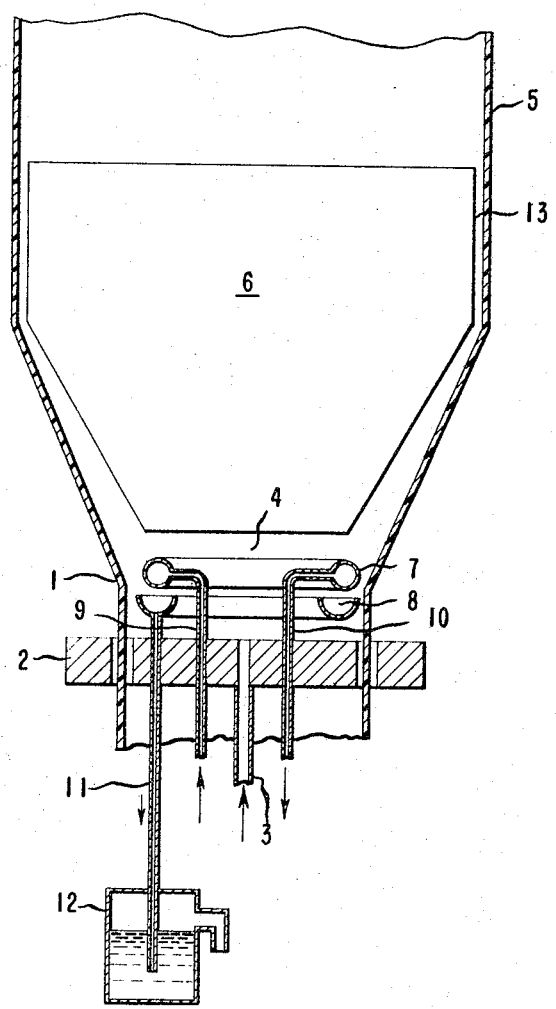
INVENTOR
CARMEN V. THOMAS
BY
ATTORNEY

United States Patent Office 3,331,901
Patented July 18, 1967

3,331,901
METHOD AND APPARATUS FOR CONDENSING VOLATILE COMPONENTS OF EXTRUDED THERMOPLASTIC TUBING
Carmen V. Thomas, Collins Bay, Ontario, Canada, assignor, by mesne assignments, to E. I. du Pont de Nemours and Company, Wilmington, Del., a corporation of Delaware
Filed Dec. 17, 1963, Ser. No. 331,150
4 Claims. (Cl. 264—95)

This invention relates to the production of thermoplastic tubing and in particular to a condenser for the volatile components of the thermoplastic polymer, which are released upon extrusion from a die.

A process of producing thermoplastic tubing known in the art incorporates a shaped cooler to cool the tubing. Such a process involves the use of two pressure zones in the inflated tubing between the extrusion and the flattening point at the nip rolls. The first pressure zone is near the extrusion die and the pressure in this zone is sufficient to cause expansion of the tubing to the desired diameter while it is still in the plastic formative state. The second pressure zone is between the point at which the expansion of the tubing to the desired diameter has been accomplished and the point of flattening. The pressure in this zone is lower than that in the first zone and is just sufficient to maintain the desired diameter of the tubing, but is too low to cause further blowing or expansion. The presence of a shaped cooler within the expanded tubing not only provides the two different pressure zones but also provides control of the rate of quenching of the extruded tubing by means of the circulation of a cooling medium in the interior of the shaped cooler.

The surface of the shaped cooler, near which the extruded tubing passes, may be a smooth or polished surface, but is preferably a discontinuous surface such as is obtained by etching or mechanically abrading a smooth surface with abrasive or lathe tools. The objective is to produce a generally even surface which, nevertheless, has a multiplicity of minute depressed areas, such as shallow pits or pores, in order to minimize any tendency of the film to "grab" the surface of the cooler. A suitable cooler may be made of steel or aluminum and is preferably given a matte finish such as is produced by grit-blasting.

In the operation of such a process, air is admitted under pressure to the zone between the die and the shaped cooler to cause the expansion of the tubing. This air is removed from the second zone between the shaped cooler and the point of flattening. To get from the first zone to the second, the air must travel along the exterior surface of the cooler, between the cooler and the tubing.

When the molten thermoplastic polymer is extruded from the die, certain components of the resin immediately volatilize into the air in the first pressure zone. The volatilized materials are caught up in the air currents in this zone and are carried by the air along the exterior surface of the cooler towards the second pressure zone. However, as these components pass the cool surface of the shaped cooler, they condense on the wall of the cooler, both as solid and liquid materials, and generally in the area between the cooler and the film. Over a period of time the condensate builds up to the point where it touches the film and causes a film break with resulting economic loss.

It is therefore an object of this invention to provide a method of overcoming this difficulty.

A further object is to provide a method of preventing the build-up of condensate on the shaped cooler.

The present invention provides a method of producing thermoplastic tubing which comprises extruding the molten thermoplastic polymer in an upward direction as shown or in a downward direction in the form of a tube from an annular die, continuously withdrawing the tubing from the point of extrusion, flattening the tubing at a point spaced from the point of extrusion, maintaining a bubble of a gaseous medium in the section of tubing extending from the point of extrusion to the point of flattening, cooling the interior of said tubing by means of a cooling medium which continuously circulates through the interior of a cooler placed within said bubble, the gaseous medium in the bubble being under a differential pressure such that the pressure in the zone between the die and the shaped cooler is sufficient to expand the tubing while in the plastic formative state to the desired diameter while the pressure in the zone from the shaped cooler to the point of flattening is sufficient to keep the tubing expanded but is insufficient to cause further expansion, condensing the volatile components from the thermoplastic polymer by means of a cooled condenser section mounted in the zone between the die and the shaped cooler and depositing said condensed volatile components into a receptacle located below said cooled condenser section.

The present invention may be further illustrated by reference to the accompanying drawing which depicts a cross sectional view of the apparatus employed according to the present invention.

As will be seen by reference to the drawing, the apparatus includes an annular die 2 from which a tube of thermoplastic material 1 is extruded. A cooler 6 is mounted coaxially with said die and air, admitted to the zone between the die and the cooler, expands the tubing to the desired diameter. The air admitted to this zone travels along the exterior surfaces of the cooler, between the cooler and the tubing, to enter the second zone. A condenser 7 is located in the zone between the die and the cooler and fairly close to the film so as to condense the volatile components of the thermoplastic resin which volatilizes as the resin emerges from the die. A catch pan 8 under the condenser collects the condensate to prevent it falling on the die to be revolatilized.

A more detailed description follows, it being understood that such more detailed description is given by way of illustratioin and explanation only, and not by way of limitation, since various changes therein may be made by those skilled in the art without departing from the scope or spirit of the present invention.

Referring now to the drawing.

A tube 1 of thermoplastic material is extruded from the annular die 2. Air is admitted under pressure through pipe 3 into pressure zone 4 causing the tube to expand to form tube 5. The tubing 5 is drawn away from the die 2 by nip rolls (not shown). A shaped cooler 6 is mounted coaxially with the die 2. A cooling medium is circulated through the shaped cooler 6 to cool tube 5. Air admitted through pipe 3 into zone 4 travels along the exterior surface of shaped cooler 6 through space 13 between the shaped cooler and the tube 5. A condenser 7 is mounted in zone 4 between the die 2 and the shaped cooler 6 and located close to tube 1 so as to be in the path of the air moving along the tubing between air inlet pipe 3 and space 13. The volatile components of the thermoplastic resin which volatilize into space 4 as the resin emerges from the die 2 tend to condense on the condenser 7. A condenser catch pan 8 is added to collect the condensate from condenser 7 and prevent it dripping on the die 2 (cooler for downward extrusion) where it can be revolatilized. A coolant is fed to the condenser by pipe 9 and returned by pipe 10. Tap water can be used as the coolant for the condenser but refrigerated water or a commercial refrigerant is used with better results. The collected condensate is removed using pipe 11 either intermittently or continuously. In the latter case a liquid seal 12 is used.

The design of the condenser does not appear to be too critical. It can either be a plate or formed from tubing such as for example, copper tubing, finned tubing or other suitable rigid heat conducting tubing.

An alternative design for the condenser is to incorporate it into the shaped cooler. Grooves or knurls can be cut into the cooler to improve the effectiveness of the design.

In actual use, such a condenser has increased the length of runs of material without breaks by 50%.

Although the invention has been used with particular success with polyethylene having a density of from .9125 to .965 it need not be so limited but can be used with good resuts with a number of other materials including polypropylene; blends of polyethylene with polypropylene, polyvinyl chloride, elastomers such as polyisobutylene, ethylene propylene compositions, polyvinyl acetate, ethylene/vinyl acetate copolymers, and copolymers of ethylene with vinyl acetate, butene-1, propylene, pentene-1, and octene-1.

What is claimed is:

1. A method of producing thermoplastic tubing which comprises extruding the molten thermoplastic polymer in the form of a tube from an annular die, continuously withdrawing the tubing from the point of extrusion, flattening the tubing at a point spaced from the point of extrusion, maintaining a bubble of a gaseous medium in the section of tubing extending from the point of extrusion to the point of flattening, cooling the interior of said tubing by means of a cooling medium which continuously circulates through the interior of a shaped cooler placed within said bubble, the gaseous medium in the bubble being under a dfferential pressure such that the pressure in the zone between the die and the shaped cooler is sufficient to expand the tubing while in the plastic formative state to the desired diameter while the pressure in the zone from the shaped cooler to the point of flattening is sufficient to keep the tubing expanded but insufficient to cause further expansion, condensing the volatile components from the thermoplastic polymer by means of a cooled condenser section mounted in the zone between the die and the shaped cooler and depositing said condense volatile components into a receptacle located below said cooled condenser section.

2. A method of producing thermoplastic tubing which comprises extruding molten thermoplastic polymer in the form of a tube from an annular die, continuously withdrawing the tubing from the point of extrusion, flattening the tubing at a point spaced from the point of extrusion, maintaining a bubble of a gaseous medium in the section of tubing extending from the point of extrusion to the point of flattening, cooling the interior of said tubing by means of a cooling medium which continuously circulates through the interior of a shaped cooler placed within said bubble, the gaseous medium in the bubble being under a differential pressure such that the pressure in the zone between the die and the shaped cooler is sufficient to expand the tubing while in the plastic formative state to the desired diameter while the pressure in the zone from the shaped cooler to the point of flattening is sufficient to keep the tubing expanded but insufficient to cause further expansion, condensing the volatile components from the thermoplastic polymer by means of a cooled condenser section mounted in the zone between the die and the shaped cooler and collecting and continuously bleeding said condensed volatile components from the bubble.

3. In an extrusion apparatus for thermoplastic polymer comprising an annular die, tube flattening means and a shaped cooler mounted coaxially with said die between said die and said flattening means, the improvement comprising a condenser mounted between said die and said shaped cooler, said condenser being capable of condensing the volatile components from the thermoplastic polymer and a receptacle located below said condenser adapted to collect therein said volatile components.

4. In an extrusion apparatus for thermoplastic polymer comprising an annular die, tube flattening means and a shaped cooler mounted coaxially with said die between said die and said flattening means, the improvement comprising a condenser mounted between said die and said shaped cooler, said condenser being capable of condensing the volatile components from the thermoplastic polymer, and condensate collecting means in communication with condensate bleed-off means.

References Cited

UNITED STATES PATENTS 2,966,700  1/1961  Dyer et al.

ROBERT F. WHITE, *Primary Examiner.*

L. S. SQUIRES, A. R. NOE, *Assistant Examiners.*